US009749712B2

United States Patent
James et al.

(10) Patent No.: US 9,749,712 B2
(45) Date of Patent: Aug. 29, 2017

(54) METHOD AND APPARATUS FOR GENERATING AN OVERLAY CODE FOR A SET TOP BOX FROM AN EXTERNAL DEVICE

(75) Inventors: Thomas H. James, Pacific Palisades, CA (US); Deanna R. Kidd, Long Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1227 days.

(21) Appl. No.: 11/841,531

(22) Filed: Aug. 20, 2007

(65) Prior Publication Data

US 2009/0055876 A1  Feb. 26, 2009

(51) Int. Cl.
| H04N 7/20 | (2006.01) |
| H04N 21/81 | (2011.01) |
| H04N 21/418 | (2011.01) |
| H04N 21/443 | (2011.01) |
| H04N 21/218 | (2011.01) |

(52) U.S. Cl.
CPC ..... *H04N 21/8173* (2013.01); *H04N 21/4184* (2013.01); *H04N 21/443* (2013.01); *H04N 21/21825* (2013.01)

(58) Field of Classification Search
CPC ............ H04N 21/21825; H04N 21/4184
USPC ....................................... 725/63, 68
See application file for complete search history.

(56) References Cited

U.S. PATENT DOCUMENTS

| 5,793,882 | A * | 8/1998 | Piatek et al. ............... 382/115 |
| 7,055,111 | B2 * | 5/2006 | Scheessele .................. 715/864 |
| 7,171,475 | B2 * | 1/2007 | Weisman ............. G06F 9/4411 709/204 |
| 9,210,476 | B1 * | 12/2015 | Chen .................. H04N 21/4383 |
| 2003/0208529 | A1 * | 11/2003 | Pendyala ............... H04L 29/06 709/203 |
| 2004/0225719 | A1 * | 11/2004 | Kisley ..................... G06F 3/061 709/212 |
| 2005/0235319 | A1 * | 10/2005 | Carpenter et al. ............. 725/52 |
| 2007/0245396 | A1 * | 10/2007 | Kwon ................ H04N 5/4401 725/132 |
| 2008/0028434 | A1 * | 1/2008 | Drazin ............... H04N 5/44543 725/134 |
| 2008/0052776 | A1 * | 2/2008 | Prabhat et al. ................ 726/15 |
| 2008/0098478 | A1 * | 4/2008 | Vaidya .................... G06F 21/34 726/24 |
| 2008/0282294 | A1 * | 11/2008 | Carpenter et al. ............. 725/58 |

* cited by examiner

Primary Examiner — Pankaj Kumar
Assistant Examiner — Sahar Baig
(74) Attorney, Agent, or Firm — Harness, Dickey & Pierce, PLC (57) ABSTRACT

A communication system 10 including a host device 14 in communication with an external device 40 through a pair of interfaces 48/50. The external device has an application code image module 42 therein. The host device 14 includes an application execution area 66 and a resource application programming interface (API) 60. The host device 14 stores the application code image in the application execution area 66. The application code image controls a function in the host device 14 using the resource application interface. When the function is performed, the application code image may be removed from the host device 14.

31 Claims, 6 Drawing Sheets

METHOD AND APPARATUS FOR GENERATING AN OVERLAY CODE FOR A SET TOP BOX FROM AN EXTERNAL DEVICE

TECHNICAL FIELD

The present disclosure relates to downloading software code from an external device to a set top box to temporarily perform a function on the set top box.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as the operating code for the set top box. Over time, various applications involving a set top box may be developed. Boxes are typically replaced when a major functional upgrade is developed. Between box replacements some useful improvements may be developed but are not implemented.

Performing other functions or newly developed functions with a set top box may be desirable without having to replace the set top box or completely remove the operating system of the set top box.

SUMMARY

The present invention allows an overlay code to be downloaded from various sources which is temporarily stored in the memory of a set top box or other host. The overlay code performs a function in the host or set top box without modifying the resident software in the host or set top box.

In one aspect of the disclosure, a method for performing a function includes coupling an external device to a host device through an interface, transferring an application code image into the memory of the host device, executing the code associated with the application code image, performing a function at the host device and removing the application code image after performing the function.

In a further aspect of the disclosure, a method of performing a function includes coupling an external device to a set top box through an interface, transferring an application code image into the application execution area in the memory of the set top box, executing the application code associated with the application code image, performing a function in the set top box through a resource application programming interface and, after performing a function, removing the application code image from the application execution area.

In a further aspect of this disclosure, a system for performing a function includes an external device having an application code image therein and a first interface. The system further includes a host device in communication with the external device. The external device includes an application execution area and a resource application programming interface (API). The host device stores the application code image in the application execution area. The code image controls the functions in the host using the resource API.

One feature of the system is the ability to perform various functions using the application code image. The application code image may, for example, be used to initiate the transfer of a media file to the external device. The media files may be audio files, video files, data files, or combinations thereof. Advantageously, the application code image does not alter the operating software of the host or set top box from which the function is performed.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The following system is described with respect to a satellite system and a broadband system. The broadband distribution system may be implemented in a cable or telephone-type system. An optical fiber may also be used as the broadband system.

Figure 1:
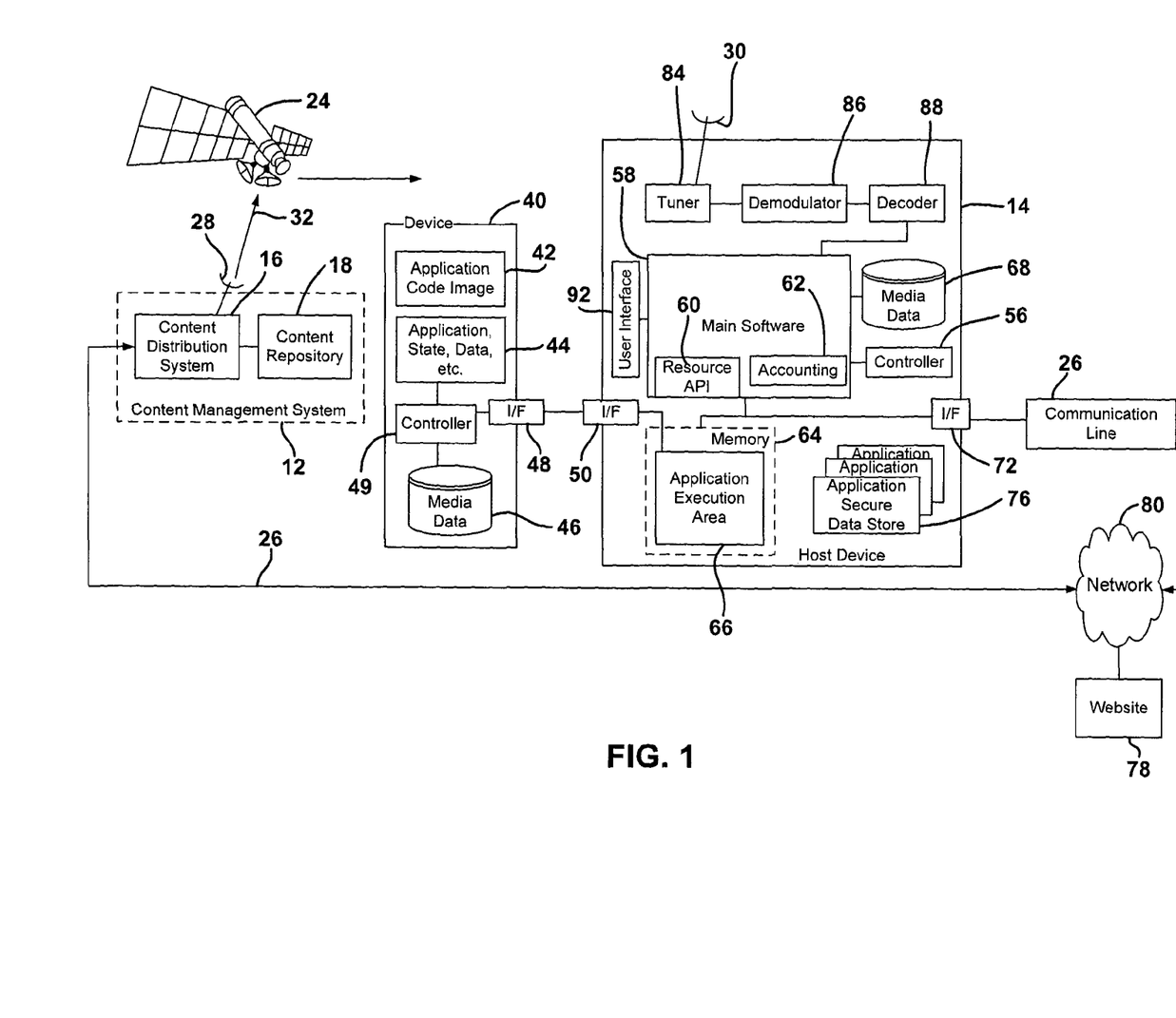
FIG. 1 is a system level view of a system for performing a function at a host or set top box.

Referring now to FIG. 1, a communication system 10 having a content management system 12 in communication with a host device such as a set top box 14. The content management system 12 includes a content distribution system 16 that receives content from a content repository 18. The content management system 18 receives input from a plurality of input sources 20 such as but not limited to, tapes, DVDs, a satellite receiver, telephone lines, and optical fibers. The content from the input sources may be in various formats.

The content from the various sources is stored in a content repository 18. The content repository 18 may store the content in various formats. The content repository 18 may be formed of memory devices such as hard drives, memory banks, servers, and the like.

The content repository 18 communicates with the content distribution system 16. The content distribution system 16 receives a request for content and distributes the content selection through a satellite 24 or a broadband communication line 26. The content distribution system 16 is in communication with the satellite 24 through an antenna 28. The host device 14 is in communication with the satellite 24 through antenna 30. Uplink signals 32 are generated from antenna 28. Downlink signals 34 are generated at the satellite 24 and are received by the antenna 30. The communication line 26 may include an optical fiber, a copper wire such as a telephone line, or the like. It should be noted that the signals may also be generated using terrestrial communication from antennas 28 and 30. Rather than directing the signals through the satellite 24, the signals may be broadcast wirelessly directly from a content distribution system 16 to the device 14 or through a terrestrial system such as a cellular system using cell towers or the like. WiMax, LAN, and WLAN systems may also be used.

An external device 40 is in communication with the host device 14. The external device 40 may be one of several devices including combinations of devices. The external device may be a game system, a portable media player, a memory device, a light client, a satellite receiver, or the like. External refers to the device not being part of the host or set top box 14.

The external device 40 includes an application code image module 42 which may be a memory and an application state and data module 44. The application code image module 42 stores an application code image for downloading to the host device 14 to perform a specific function. The application code image module 42 may include various types of memory but not limited to flash memory.

The external device 40 may also include media and data module 46. The media and data module 46 may include various types of memory including chip based memory or a hard drive or mini hard drive. Media and data module 46 may include a memory for storing various types of media received from the host device 14 or other devices. The media and data module 46 may include media files such as audio files and video files, as well as data files.

The device 40 may also include a first interface 48. Interface 48 may be various types of interfaces including a direct wired interface or wireless interface. A wired interface may include an Ethernet connection or a USB connection. A wireless interface may include various types of interfaces including a Bluetooth, WiFi, or wireless or local area network interface. A controller 49 controls the operation of the device as well as the flow of data and the code image to and from the device. The controller 49 may be microprocessor based.

The host device 14 includes a second interface 50 in communication with the first interface 48. The second interface 50 communicates with various modules within the host device 14. The host device 14 may include a controller 56 that is used for controlling the overall flow of data within the host device 14. The controller 56 may, in fact, be coupled to each of the modules within the host device 14. The host device 14 includes a main software module 58. The main software module includes a resource application programming interface (API) 60. The main software module also includes an accounting module 62 which keeps track of application activity in the secured area. The accounting module 62 may, for example, keep track that an application was performed on the system. The accounting module 62 may not necessarily keep track of all the functions performed by the application code image.

The second interface 50 may be coupled to a memory 64 that includes an application execution area 66. The application execution area 66 receives the application code image through the interface 50. The application execution area 66 may, for example, be RAM or part of RAM memory. The application execution area 66 is used to execute the function within the application code and may perform various functions by gaining access to various resources in conjunction with the resource API 60. Downloading files to or from the external device is one example of a function. Another example is that the application code may be a browser to browse available content on the host device.

The host device 14 may also include media and data module 68. Media and data module 68 may store various types of media and data in a memory. The media and data module 68 may store audio files, video files, and data files. The data files may be obtained in various manners including through the satellite antenna 30 and through a secondary interface 72 from a communication line 26. The data files may be stored in a database.

The host device 14 may also include application secure data store module 76 that is used to store data in a secure manner. Several application secure data store modules may be included in the device 14. By storing the data in a secure manner, the main software 58 may not have access to this data. The execution of the application code image may leave a specific piece of data for future reference in the application secured data store 76 after the application code image is removed from the application execution area 66. This will be described further below.

The secondary interface 72 is in communication with the communication line 26 and ultimately to the content distribution system 16. The communication line 26 may be used for communicating requests to the content distribution system 16. Also, various content may be received through the secondary interface 72 through the communication line 26. The communication line 26 may also provide a means for the host device 14 to communicate with a website 78 through a network 80 such as the Internet.

The host device 14, as mentioned above, may be a set top box. Thus, the set top box may also include a tuner 84, a demodulator 86, and a decoder 88 for tuning, demodulating, and decoding signals received from the satellite 24 received by the satellite antenna.

As will be described below, the uploaded code corresponding to the application code image may operate on its own and gain access to various resources within the host device by way of the resource API 60. The application code may request application secured data storage of particular data that is meant to be persistent over time even after the uploaded application is removed from the host. The application secured data store is not accessible from either the host or any other application that may be installed and running on the host. The main software 58, media data files 68, and accounting data 62 are also not accessible by any overlayed code application on the host device 14. The host device 14 may keep track of the application activity in the secure accounting area 62. Access to the resource API 60 may be restricted and controlled by a service provider.

During execution of the application code image, a user interface such as a remote control or front panel 92 may be allowed as directed by the resource API 60. As will be described below, upon termination of the application code, the application execution area 66 is cleared while the application secured data store 76 may be untouched so that the data is persistent therein.

Conditional access may also be provided to prevent a rogue application from executing on the host device. A security code within the software code may be required by the API before the overlayed application code is executed. If the proper code is provided, the resource API may be enabled.

In FIGS. 2-5, simplified block diagrammatic views of the external device and the host device are set forth. The other elements of FIG. 1 may be incorporated therein.

Figure 2:
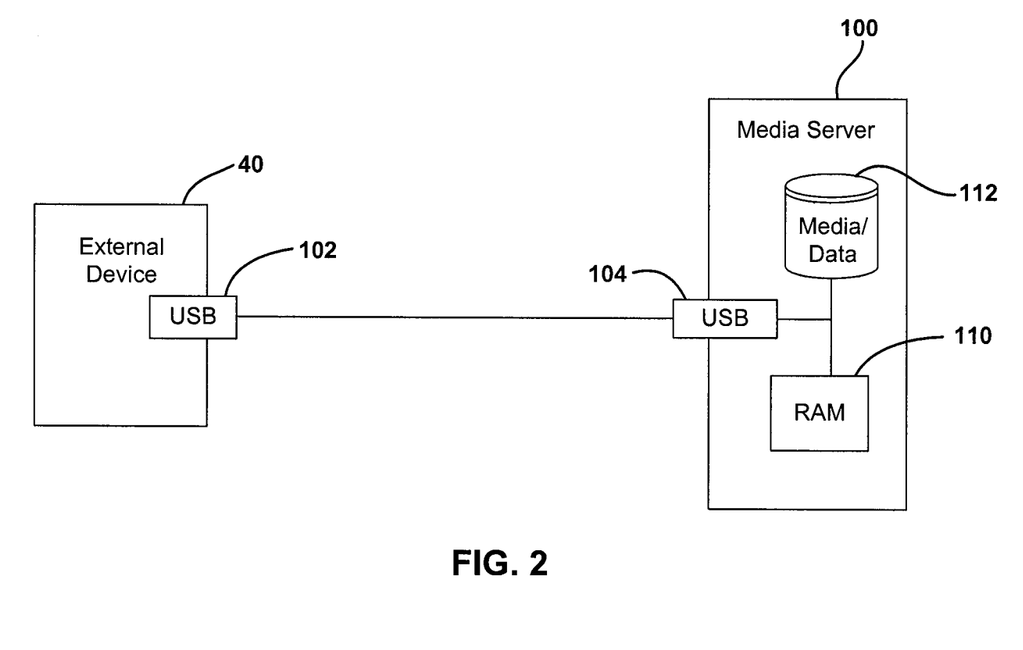
FIG. 2 is a simplified block diagrammatic view of a device.

Referring now to FIG. 2, an external device such as a portable media player for a game device 40 may be coupled to a host device such as a media center 100. The media center 100 and the external device 40 may be coupled together using a USB interface 102/104. The overlay code or application code image within the external device 40 is stored within the RAM 110 of the media center 100. Various applications or functions may be performed by the overlay code within the RAM 110 using the resources of the media center 100. When complete, the overlay code within the RAM may copy any state information back to the external device and store that within the application state and data module (44 of FIG. 1). The overlay code is then deleted from the RAM 110. While the application code image is resident within RAM, media or data files may be transferred from the media and data module 112.

Figure 3:
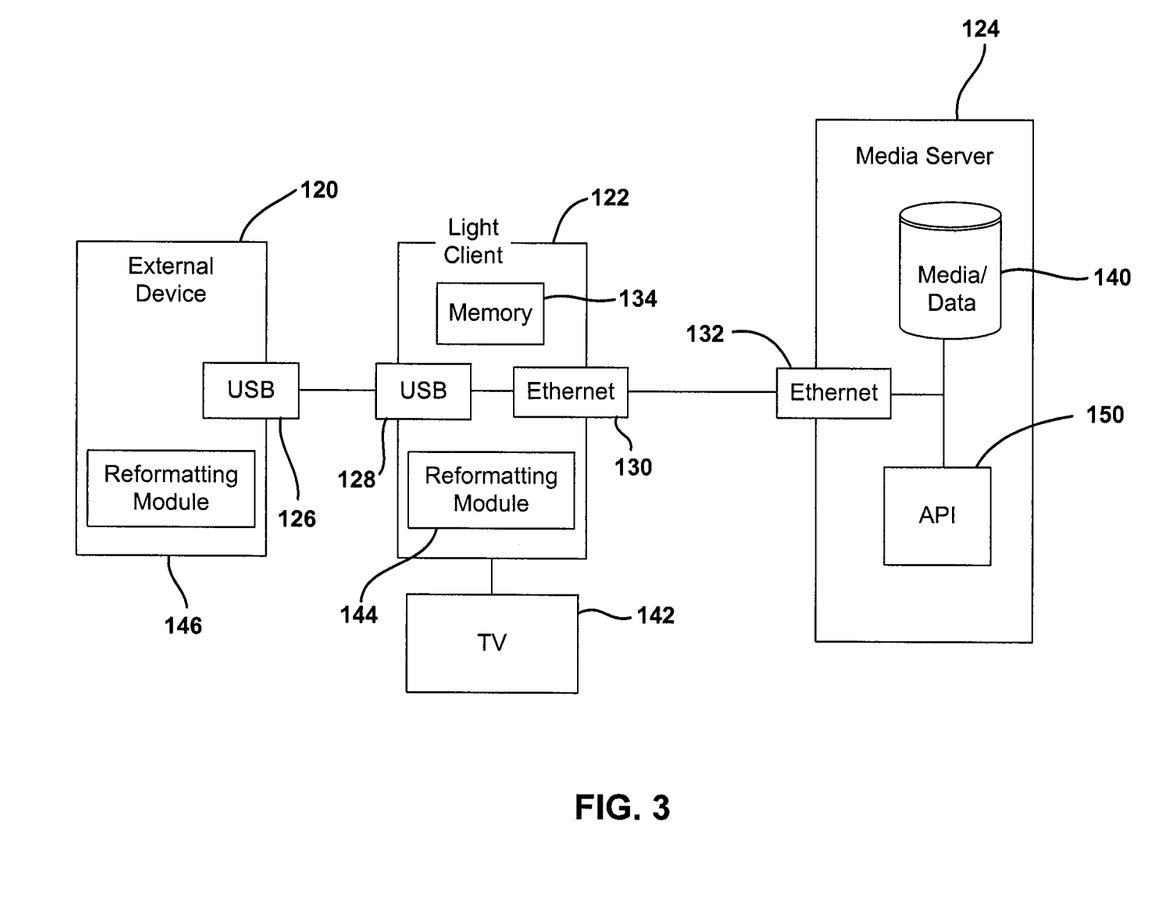
FIG. 3 is a block diagrammatic view of a device including a light client for use in the present disclosure.

Referring now to FIG. 3, a simplified block diagrammatic view of an external device 120 in communication with a light client 122, which is in communication with a media server 124, is illustrated. In this example a first interface 126 such as a USB interface couples the external device 120 to a second interface 128 of the light client 122. Light client 122 has a second interface 130 such as an Ethernet interface that is in communication with a fourth interface 132, also an Ethernet interface, of the media server 124. The light client 122 acts as an intermediate device between the external device 120 and the media server 124. In this example, when an external device 120 would like to download a file from the media server 124, an application code image for downloading a file from the media/data storage device 140 may be stored within a memory 134 of the light client 122. When the application is launched, the user interface may become a television 142 attached to the light client. Even though a desired music or other type of file may reside on the media server 124, a list of files that are downloadable are available on light client 122 and, thus, are available to the external device 120. The application code on the light client 122 retrieves the file through an appropriate API 150 on the media server 124. A file may be modified, reformatted and recoded within the light client 122 in reformatting module 144. Further, the external device 120 may also include a reformatting module 146 for reformatting the file that is passed through the light client 122. That is, various types of files stored within media/data storage 140 may be passed in their native format through the light client to the external device 120 where it may be reprocessed in the reformatting module 146. By using the configuration of FIG. 3, the details of the external device may be completely hidden from the media server 124. For example, the media server 124 may be responsible for enforcing digital rights for the content under its control. If a purchase is required to enable download, the API 150 within the media server 124 may perform any purchase dialogue required with the external device or external to the media server 124.

In a variation of the above, the overlay code may be loaded into a media server. The light client 122 may thus be the interface between the media server and external device 120. The light client 122 would contain the overlay code that works with the media server while delivering content to the external devices. Thus, the external device would not have to have the overlay code therein. The external device manufacturers would thus not have to put an overlay code in each device making the application transparent to what is happening other than an interface is occurring.

Figure 4:
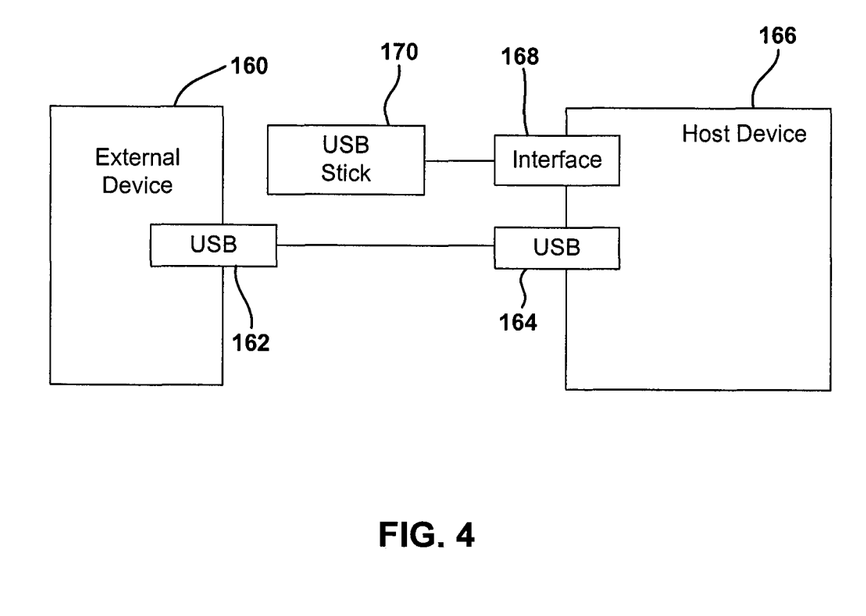
FIG. 4 is a block diagrammatic view including a separate code module and device interface according to the present disclosure.

Referring now to FIG. 4, an external device 160 having a first interface 162 in communication with a second interface 164 of a host device 166 is illustrated. The host device 166 includes a third interface 168 for interfacing with a completely separate device such as a USB stick 170. USB stick 170 is one example of various types of memory devices such as flash memory that may be coupled to the interface 168. The USB stick or other memory 170 may include the overlay code or application code image therein. The application code image may be transferred from the USB stick 170 into the host device in a similar manner described above with respect to FIG. 1.

Figure 5:
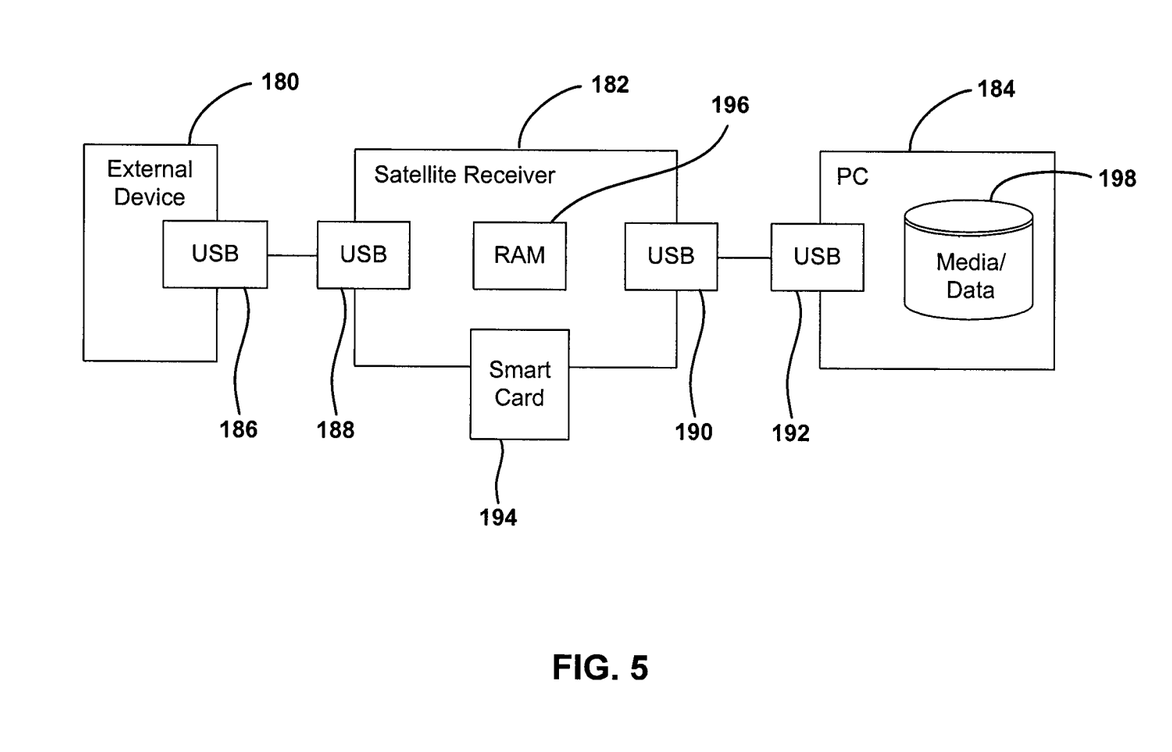
FIG. 5 is a block diagrammatic view illustrating an intermediate device between an external device and a personal computer.

Referring now to FIG. 5, another embodiment is illustrated with an external device 180 coupled to a satellite receiver 182 which, in turn, is coupled to a personal computer 184. A first interface 186 is in communication with a second interface 188 on the satellite receiver 182. A third interface 190 on the satellite receiver 182 is in communication with the personal computer 192. All of the interfaces 186, 188, 190, 192 are illustrated as USB interfaces. However, various types of interfaces may be used. In this example, the intermediate device is the satellite receiver 182.

The satellite receiver 182 may include a smart card 194 for granting conditional access to content delivered by a content provider such as the content management system 12 of FIG. 1. The smart card 194 includes essentially no storage and the overlay application code may not be employed therein. The overlay code is transferred from the external device 180 to RAM 196 within the satellite receiver. From the RAM 196, the code image is executed.

The personal computer 184 may include media/data storage 198 for storing various audio, video and data files.

It should be noted that the USB interface may be eliminated and the satellite receiver may be in the form of a card inserted directly in the bus of the computer.

Figure 6:
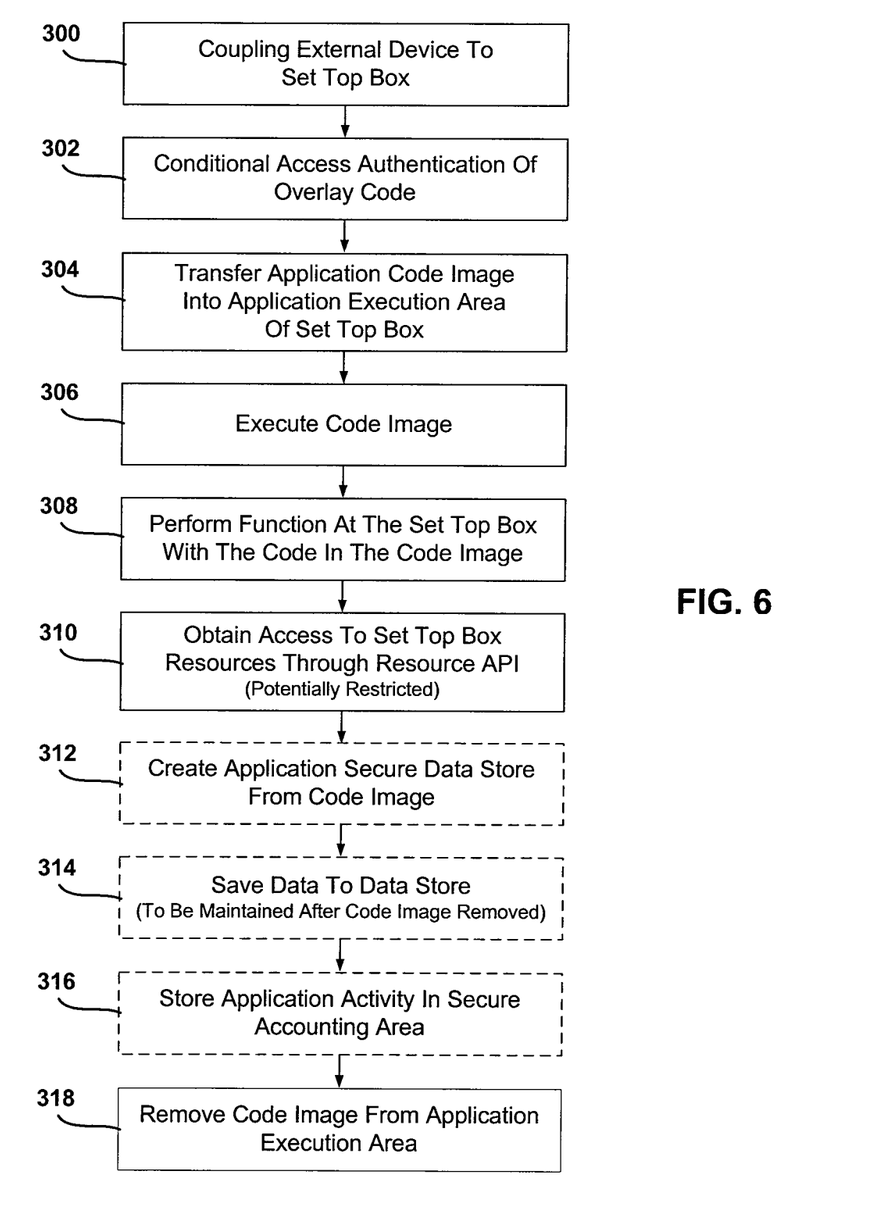
FIG. 6 is a flowchart illustrating a method for operating the present disclosure.

Referring now to FIG. 6, one example of a method for operating the present disclosure is illustrated. In step 300, an external device such as a game, a personal media player, or other external device is coupled to a host device such as a set top box. In the following example, a set top box will be used.

In step 302, a conditional access authentication of an overlay code is performed. The conditional access may be performed using the set top box or other method. In step 304, the application code image is transferred into the set top box. More specifically, the application code image is transferred to the application execution area of the set top box. In step 306, the application code associated with the code image is executed.

In step 308, a function is performed at the set top box with the code in the code image. In step 310, one example of a function is to obtain access to set top box resources through the application programming interface (API). As mentioned above, the resource API may only provide limited or restricted access to various resources within the set top box. In step 312, an optional step is set forth for creating an application secured data store on the host from the code image. In optional step 314, data generated during execution of the application code is stored in the secured data store which may be maintained after the code image is removed from the host device. In optional step 316, an application activity is stored in the secure accounting area of the host device. In step 318, the code image is removed from the application execution area. Thus, the only remnants of the code image may be a secured piece of data in the application secured data store and an accounting that the code data actually existed at some point.

Thus, as can be seen, various functions may be performed by the application code image. For example, various audio, video, and data files may be exported or imported to the set top box to or from the external device. Games and internal database access may also be provided through the interfaces at the set top box. The external device may request access to various games or the external databases through the set top box. The internal databases, video files, audio files, and the like may be stored within the set top box or may be stored in a remote location such as at the content delivery system. As can be appreciated, various combinations for obtaining data or transmitting data from an external device is set forth.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   coupling an external device to a host device through an interface;
   transferring an application code image into an application execution area of a memory of the host device;
   executing the application code associated with the application code image and generating application data in response thereto;
   storing the application data in a secure data store of the host device in response to executing;
   performing a function at the host device; and
   removing the application code image from the memory of the host device after performing the function without removing the application data in the secure data store.

2. A method as recited in claim 1 wherein the external device comprises a video game.

3. A method as recited in claim 1 wherein the external device comprises a portable media player.

4. A method as recited in claim 1 wherein the external device comprises a memory device.

5. A method as recited in claim 1 wherein the host device comprises a personal computer coupled to a satellite receiver.

6. A method as recited in claim 1 wherein the external device comprises a memory device separate from the external device.

7. A method as recited in claim 1 wherein the host device comprises a set top box.

8. A method as recited in claim 1 wherein the host device comprises a satellite set top box.

9. A method as recited in claim 1 wherein the interface comprises a USB interface.

10. A method as recited in claim 1 wherein the interface comprises an Ethernet connection.

11. A method as recited in claim 1 wherein the interface comprises a direct connection.

12. A method as recited in claim 1 wherein the interface comprises a Bluetooth connection.

13. A method as recited in claim 1 wherein the memory comprises a RAM.

14. A method as recited in claim 1 wherein the secure data store is accessible by the host device.

15. A method as recited in claim 1 further comprising storing application activity in a secure accounting area of the host.

16. A method as recited in claim 1 further comprising performing conditional access authentication of the code image prior to transferring the application.

17. A method as recited in claim 1 wherein performing a function comprises transferring media file from the host to the external device.

18. A method as recited in claim 1 wherein the media file comprises an audio file, a video file or a data file.

19. A method as recited in claim 1 wherein the code comprises a browser.

20. A method comprising:
   coupling an external device to a set top box through an interface;
   transferring an application code image into an application execution area in the memory of the set top box;
   executing the application code associated with the application code image;
   performing a function in the set top box through a resource API and generating application data in response thereto;
   storing the application data in a secure data store of the host device in response to executing; and
   after performing the function, removing the application code image from the application execution area without removing the application data in the secure data store.

21. A method as recited in claim 20 wherein the interface comprises a USB interface.

22. A method as recited in claim 20 wherein the interface comprises an Ethernet connection.

23. A method as recited in claim 20 wherein the interface comprises a direct connection.

24. A method as recited in claim 20 wherein the interface comprises a Bluetooth connection.

25. A system comprising:
   an external device having an application code image therein and a first interface;
   a host device in communication with the external device, said host device comprising an application execution area, a resource application programming interface (API) and generating application data in response thereto, and storing the application data in a second data store of the host device in response to executing;
   said host device stores the application code image in the application execution area, said code image controlling a function in the host using the resource API, wherein the application code image is removed from the application execution area after performing the function without removing the application data in the secure data store.

26. A system as recited in claim 25 wherein the application code image is removed from the application execution area after performing the function without removing the data in the application secure data store.

27. A system as recited in claim 25 wherein the application code image is removed from the application execution area after performing the function.

28. A system as recited in claim 25 wherein the host device comprises a personal computer coupled to a satellite receiver.

29. A system as recited in claim 25 wherein the external device comprises a separate memory device.

30. A system as recited in claim 25 further comprising a light client coupling the external device to the host device.

31. A system as recited in claim 25 wherein the function comprises transferring a file from the host device to the external device and the light client reformatting the file.

* * * * *